Patented Dec. 29, 1931

1,838,241

UNITED STATES PATENT OFFICE

WILLIAM ARTHUR WILLIAMS, OF EDINBURGH, SCOTLAND

ELECTRODEPOSITION OF RUBBER

No Drawing. Application filed June 30, 1928, Serial No. 289,622, and in Great Britain June 30, 1927.

This invention relates to the electro-deposition of rubber from a vulcanized or unvulcanized rubber latex, and to the electro-deposition of the corresponding constituent of analogous latices.

A feature of the present invention is the use in or addition to the latex of a liquid or solid electrolyte or solution which will not of itself cause coagulation of the latex except after a considerable interval of time, if at all, and which will not evolve, during electro-deposition, any substance deleterious to the latex or deposited rubber, but which by its presence or by the presence of substances evolved from it during electro-deposition, will enter into chemical reaction with the anode of a pair of different electrodes and thereby act as an excitant of an internal electric current, whose electrophoretic action is assisted by applying to the electrodes an external source of current of such voltage that the total difference of potential between the electrodes shall not be greater than is sufficient to effect electrolysis of water, but sufficient to cause electrodeposition of rubber or analogous substance upon the anode element of the circuit and so make is possible to employ an external source of current for the excitation of the electrolytic action of lower strength than is necessary for the same rate of electro-deposition of rubber or the like from a latex containing no such electrolyte or solution.

It is found in practice that the internal source of current gradually exhausts itself after a time and it is one of the objects of the present invention to maintain the voltage constant by means of the auxiliary external source of current, but this external current is of small amount and is utilized only to ensure that in works practice the thickness of the deposit can be controlled by time instead of by ampere hours.

The rubber or homologous substances thereby deposited on the anode are of a homogeneous nature and free from porosity by the reduction or elimination of any gas generated at the anode.

Any number of cells may be connected up anode to anode and cathode to cathode or anode to cathode in the methods already well-known as series and parallel connections or by a combination of the two, provided always that the difference of potential between the anode and cathode of any one cell is never greater than that which will decompose water.

Other chemicals or fillers, such for example, as zinc oxide or sulphur or other vulcanizing agents, with or without accelerators of vulcanization, which do not cause premature coagulation of the latex, may be added before introducing the electrodes, or during electro-deposition, in order that such chemicals or fillers will become incorporated with the deposited rubber.

As an example of one method of carrying out the invention, to ordinary commercial alkaline latex, a solution of ammonium chloride is added in insufficient quantity to cause coagulation, e. g. in the proportion of up to 20 parts by weight of ammonium chloride to 100 parts by weight of latex, and electrophoresis of this mixture of latex and ammonium chloride is conducted by the use of suitable electrodes of different materials connected to an external source of current of such voltage that the total voltage between the electrodes shall be approximately 1.5 volts, thereby effecting deposition of the rubber upon the anode. The electrodes employed may be a zinc anode and carbon cathode, and the latter may be employed in conjunction with a depolarizing agent.

The deposition of the rubber or like constituent from the latex can be continued until the desired thickness of rubber or the like has been obtained upon the anode element, which may be shaped to give any desired form to the deposited rubber. The article is then complete in the case of vulcanized latex, and in the case of ordinary commercial latex it can then be vulcanized, if desired, by any known method.

I do not confine myself to the chemicals or materials herein mentioned, or to the proportional degree of strength stated, these being only given as examples.

I claim:

A process for the production of rubber or a homologous substance by the electro-deposition of a vulcanized or unvulcanized latex, which consists in introducing zinc and carbon electrodes into the latex, utilizing in or adding to the latex ammonium chloride in insufficient quantity to cause coagulation, and applying to the electrodes an external source of current of such voltage that the total difference of potential between the electrodes shall not be greater than is sufficient to decompose water.

The foregoing specification signed at Edinburgh, this eighteenth day of June, 1928.

W. A. WILLIAMS.